March 21, 1961  E. P. CZERWIN ET AL  2,976,173
PROCESS FOR APPLYING A HYDRAULIC CEMENTITIOUS
MATERIAL TO A STRUCTURAL BASE AND
ARTICLE PRODUCED THEREBY
Filed Sept. 26, 1958
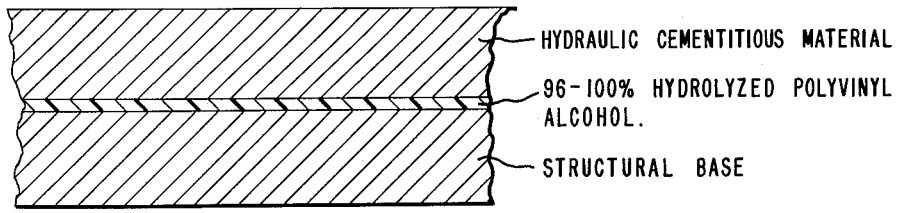
— HYDRAULIC CEMENTITIOUS MATERIAL
— 96-100% HYDROLYZED POLYVINYL ALCOHOL.
— STRUCTURAL BASE

United States Patent Office 2,976,173
Patented Mar. 21, 1961

2,976,173
PROCESS FOR APPLYING A HYDRAULIC CEMENTITIOUS MATERIAL TO A STRUCTURAL BASE AND ARTICLE PRODUCED THEREBY

Edward P. Czerwin, Oakwood Hills, and Richard S. Seidel, Claymont, Del., assignors to E. I. du Pont de Nemours and Company, Wilmington, Del., a corporation of Delaware Filed Sept. 26, 1958, Ser. No. 763,449

6 Claims. (Cl. 117—70)

This invention relates to the application of concrete, plaster or the like to surfaces of concrete or other hydraulic material, and is more particularly concerned with the process for improving the bond between such materials by precoating the surface of the base material with polyvinyl alcohol, and with the resulting laminated structures.

The use of synthetic resins for improving the strength or flexibility of concrete and plaster, and for improving their adhesion to base materials when repairing or coating concrete, plaster and metal, has received considerable attention in recent years. The investigations have been directed to accomplishing these improvements with water resistant resins. Some of this work is discussed in a German article by E. Rissel, "Repairing Old Concrete by the Use of Artificial Materials," appearing in Zement-Kalk-Gips, 6, 101–105 (No. 4, April 1953). The article discloses the use of an aqueous dispersion of polyvinyl acetate as an adhesive with mortar and concrete for repairing concrete floors and coatings, damaged stair steps, and particularly for repairing highways, the area to be repaired being coated with the emulsion and allowed to dry, and emulsion also being added to the patching mix. A significant property is stated to be that the basic constituent of the emulsion, polyvinyl acetate, is, after it has been dried once, insoluble in water, but subject to slight swelling.

Larsen et al., U.S. Patent No. 2,760,885 of August 28, 1956, likewise discloses use of polyvinyl acetate emulsion to form a bonding film on base material, more particularly in a method of plastering, as in applying a finish coat of hydraulic cementitious material, such as Portland cement or gypsum plaster on set concrete, etc. The patent states that the invention is directed to the method of applying plaster whereby the plaster is interlocked with the base material through the intermediary of the bonding agent, and attributes success of the process to re-emulsifying of the polyvinyl acetate film during application of the plaster. Plastering involves considerable agitation, in troweling on and smoothing the plaster, which can remove re-emulsified adhesive from the interface unless special precautions are taken.

The commercially available polyvinyl acetate emulsions are prepared by aqueous emulsion polymerization of vinyl acetate in the presence of an emulsifying agent. A cold water-soluble, partially hydrolyzed polyvinyl acetate of 87–89% hydrolysis, i.e., 87–89% of the polymer is $CH_2CHOH)_n$, is commonly used as the emulsifying agent, and dried films of such polyvinyl acetate emulsions can be re-emulsified in water at normal temperatures. Polyvinyl alcohol of 96–100% hydrolysis may also be used as the emulsifying agent, but dried films prepared from such polyvinyl acetate emulsion do not redisperse in water at normal temperatures. This polyvinyl alcohol dissolves in hot water and remains dispersed after the solution is cooled, but is not dissolved by cold water.

It is an object of this invention to provide a process which gives improved bonds between materials of the type discussed. A further object is to provide such a process which does not require mixing of adhesive with the applied material or special precautions during application of new material to the old material. Another object is to provide new laminated structures. Other objects will become apparent from the specification and claims.

In accordance with this invention the surface of set concrete or other hydraulic material is coated with polyvinyl alcohol of at least 96% hydrolysis, i.e., 96–100% of the polymer is $(CH_2CHOH)_n$ where $n$ is a large whole number. At any convenient time therafter a conventional aqueous mix of concrete, plaster or other hydraulic material is applied to the coated surface and allowed to set. The bonds obtained in this way have remarkably high strengths, the bond strengths do not decrease after aging, and the bonds have excellent resistance to water. Bonds between new and old concrete can be obtained which are so strong that breakage will occur in the properly aged concrete rather than at the new-to-old interface. A sectional view of the finished bonded structure is shown in the drawing.

A solution of polyvinyl alcohol in hot water is most easily prepared by forming a slurry in cold water and then heating the slurry while stirring until the polyvinyl alcohol dissolves. The solution is then applied hot or cold to the hydraulic base material to form a film in the same manner as paint. A single coat of aqueous solution containing at least 5% of the polyvinyl alcohol is suitable for bonds exceeding the strength of concrete. The coating is preferably dried before the new concrete or plaster is applied, in order to assure a sufficiently uniform layer of polyvinyl alcohol at the interface, but the coating can be applied as many hours or days in advance as desired. The surface of the base material should be adequately coated with polyvinyl alcohol, but the manner in which this is accomplished is immaterial. In the case of concrete or similar porous surfaces the coverage is preferably about 5.0 to 100.00 ounces of dry polyvinyl alcohol per 1000 square feet, although thinner coats will also greatly increase bond strengths between the new and old materials.

The polyvinyl alcohol can be prepared in the conventional manner from polyvinyl acetate, but must be at least 96% hydrolyzed. Preferably it is of medium viscosity, i.e., a 4% solution in water has a viscosity of about 20 to 35 centipoises at 20° C. High viscosity polyvinyl alcohol is difficult to apply uniformly and low viscosity polyvinyl alcohol gives less satisfactory bonds.

The invention is useful for obtaining improved bonds when applying concrete, mortar, gypsum plaster and other surfacing or patching materials to set concrete or plaster, cinder or concrete block, brick, lath and other structural materials. After the surface to be cover has been coated with the polyvinyl alcohol, there need be no change in conventional procedures for surfacing walls, ceilings, floors or steps, for patching concrete, or the like. The greatly improved bond obtained with the specified polyvinyl alcohol in comparison with only partially hydrolyzed polyvinyl acetate is illustrated by the following example:

*Example*

A concrete slab, 10.7 inches long by 4.5 inches wide by 2.5 inches thick, was cut from a steel reinforced stair tread. Polyvinyl alcohol of 99% hydrolysis, and having a viscosity of about 30 centipoises as a 4% aqueous solution at 20° C., was dissolved in water at 90° C. with stirring to form a 12.5% solution. This was then cooled to room temperature. The upper surface of the concrete slab was freed of dust and one coat of the above solution was applied with a brush. The coverage was 0.747 ounce of polyvinyl alcohol solution per square foot. This corresponds to a coverage of 93.37 ozs. dry resin per 1000 sq. ft. The film was allowed to dry for 24 hours. A 1-inch thick layer of Portland cement-aggregate topping was cast over the coated surface of the concrete slab and cured for 14 days. In order to provide a cross brick specimen for testing the bond strength obtained with the polyvinyl alcohol, a fired brick (8 x 3.7 x 2 inches) was positioned at right angles to the old concrete component and cemented to the new concrete with epoxy resins adhesive. The bond strength was then tested by loading the joint in tension in accordance with A.S.T.M. Procedure C321–54T, "Tentative Method of Test for Bond Strength of Chemical-Resistant Mortars." Excellent bonds were obtained which did not decrease after 3 months aging.

The above example was repeated, but using polyvinyl alcohols solutions of progressively lower concentrations to give lower coverage on the surface of the concrete slab. For comparison, the example was repeated with the polyvinyl alcohol replaced by partially hydrolyzed polyvinyl acetate (87–89% hydrolysis) of high viscosity (about 42 cp.), medium viscosity (about 22 cp.), and low viscosity (about 5 cp.). The example was also repeated with the polyvinyl alcohol replaced by a 55% aqueous dispersion of polyvinyl acetate prepared with polyvinyl alcohol of at least 99% hydrolysis as the emulsifying agent, dried films of which do not re-emulsify in water at normal temperature.

Each of the above tests was made in triplicate to minimize experimental errors with the following results:

BOND STRENGTHS OF CONCRETE CAST OVER OLD CONCRETE PRECOATED WITH VARIOUS BONDING AGENTS

| Bonding Agent Applied | Coverage, Dry (oz./sq. 1,000 ft.) | Bond Strength (lbs./sq. in.) |
| --- | --- | --- |
| A. Polyvinyl alcohol, 99% hydrolyzed, medium viscosity (12.5% aqueous solution). | 93.37 | (1) 216. (2) Broke in concrete. (3) Broke in concrete. |
| B. Polyvinyl alcohol, 99% hydrolyzed, medium viscosity (10% aqueous solution). | 49.63 | (1) Broke in concrete. (2) Broke in concrete. (3) Broke in concrete. |
| C. Polyvinyl alcohol, 99% hydrolyzed, medium viscosity (7.5% aqueous solution). | 27.08 | (1) Broke in concrete. (2) Broke in concrete. (3) Broke in concrete. |
| D. Polyvinyl alcohol, 99% hydrolyzed, medium viscosity (5% aqueous solution). | 18.05 | (1) 169. (2) Broke in concrete. (3) 96. |
| E. Polyvinyl alcohol, 99% hydrolyzed, medium viscosity (2.5% aqueous solution). | 5.96 | (1) 160. (2) Broke in concrete. (3) 104. |
| F. Partially hydrolyzed PVA, 87–89% hydr., high viscosity (15% aqueous solution). | 137.10 | (1) 72. (2) 70. (3) 79. |
| G. Partially hyrdolyzed PVA, 87–89% hydr., medium viscosity (15% aqueous solution). | 112.80 | (1) 77. (2) 78. (3) 80. |
| H. Partially hydrolyzed PVA, 87–89% hydr., low viscosity (20% aqueous solution). | 86.40 | (1) Broke in handling. (2) 6. (3) 6. |
| I. Polyvinyl acetate emulsified with 99% hydrolyzed polyvinyl alcohol (55% aqueous dispersion). | 363.0 | (1) 26. (2) 45. (3) 25. |
| J. No bonding agent (for control). | | (1) 102. (2) 50. (3) 60. |

The Portland cement-aggregate topping used in the above example was prepared and applied according to a standard procedure. Trap rock aggregate of the following sieve analysis was used:

GRADING—FINE AGGREGATE

| | Percent |
| --- | --- |
| Passing ⅜-inch sieve | 100 |
| Passing No. 4 sieve | 95–100 |
| Passing No. 16 sieve | 45– 65 |
| Passing No. 50 sieve | 5– 15 |
| Passing No. 100 sieve | 0– 5 |

GRADING—COARSE AGGREGATE

| | Percent |
| --- | --- |
| Passing ½-inch sieve | 100 |
| Passing ⅜-inch sieve | 95–100 |
| Passing No. 4 sieve | 40– 60 |
| Passing No. 8 sieve | 0– 5 |

A mixture was prepared of 1 part by weight cement, 1 part fine aggregate, 1¾ parts coarse aggregate and only sufficient water to produce a workable mixture. The consistency was such that within 30 minutes after casting it will sustain a weight of 2 pounds per square inch directly on the topping without causing a surface depression. The ingredients were thoroughly mixed until the topping mix was uniform. The topping was applied to the coated concrete slab between set screeds, tamped thoroughly, and smoothed. The topping was then cured for two weeks by covering it with polyethylene film to prevent evaporation and sprinkling with water often enough to assure continuously wet conditions.

Since many different embodiments of the invention may be made without departing from the spirit and scope thereof, it is to be understood that the invention is not limited by the specific illustrations except to the extent defined in the following claims.

We claim:
1. A laminated structure comprising a base material, a coating thereon consisting essentially of polyvinyl alcohol of 96% to 100% hydrolysis, and a hydraulic cementitious material overlying and adhering to said coating.

2. A laminated structure comprising hydraulic cementitious material, a coating thereon consisting essentially of medium viscosity polyvinyl alcohol of 96% to 100% hydrolysis, and hydraulic cementitious material overlying and adhering to said coating.

3. A laminated structure as defined in claim 2 wherein the coverage of said coating is 5.0 to 100.0 ounces of polyvinyl alcohol per 1000 square feet.

4. The process of applying a hydraulic cementitious material to a base material which comprises coating the base material with polyvinyl alcohol of 96% to 100% hydrolysis to form a film consisting essentially of polyvinyl alcohol on the base material and applying an aqueous mixture of the hydraulic cementitious material to the coated base material.

5. In a process for applying an aqueous mixture of hydraulic cementitious material to a hydraulic cementitious base material, the method of improving the bond between said materials which comprises coating said base material with polyvinyl alcohol of 96% to 100% hydrolysis to form a bonding film consisting essentially of polyvinyl alcohol thereon prior to applying the aqueous mixture of hydraulic cementitious material.

6. In a process for applying an aqueous mixture of hydraulic cementitious material to a hydraulic cementitious base material, the method of improving the bond between said materials which comprises coating said base material with a solution consisting essentially of aqueous polyvinyl alcohol of 96% to 100% hydrolysis and medium viscosity to provide a coverage of 5.0 to 100.0 ounces of polyvinyl alcohol per 1000 square ft. of coating and drying the coating, the aqueous mixture of hydraulic cementitious material then being applied to the coated base material and cured in conventional manner.

References Cited in the file of this patent

UNITED STATES PATENTS

| 2,576,955 | Ludwig | Dec. 4, 1951 |
| 2,733,995 | Robinson | Feb. 7, 1956 |
| 2,760,885 | Larsen et al. | Aug. 28, 1956 |